United States Patent
Podolsky (10) Patent No.: US 7,729,353 B1
(45) Date of Patent: Jun. 1, 2010

(54) SYSTEM, METHOD AND COMPUTER PROGRAM PRODUCT FOR DISCOVERING NETWORK CONNECTIVITY AMONG NETWORK DEVICES BASED ON TOPOLOGICAL INFORMATION

(75) Inventor: Gabriel Podolsky, Nesher (IL)

(73) Assignee: Amdocs Software Systems Limited, Dublin (IE)

(*) Notice: Subject to any disclaimer, the term of this patent is extended or adjusted under 35 U.S.C. 154(b) by 375 days.

(21) Appl. No.: 11/671,849

(22) Filed: Feb. 6, 2007

(51) Int. Cl.
*H04L 12/28* (2006.01)
(52) U.S. Cl. .................. 370/392; 370/401; 370/466
(58) Field of Classification Search ........... 370/392, 370/400, 401, 466
See application file for complete search history.

(56) References Cited

U.S. PATENT DOCUMENTS

| | | | |
|---|---|---|---|
| 2003/0061339 A1 | 3/2003 | Benfield et al. | 709/224 |
| 2004/0052257 A1* | 3/2004 | Abdo et al. | 370/392 |
| 2004/0255028 A1* | 12/2004 | Chu et al. | 709/227 |
| 2005/0097203 A1* | 5/2005 | Unbehagen et al. | 709/223 |
| 2006/0167965 A1 | 7/2006 | Black et al. | 709/200 |
| 2007/0280241 A1* | 12/2007 | Verma | 370/392 |

* cited by examiner

*Primary Examiner*—Jayanti K Patel
*Assistant Examiner*—Jung Park
(74) *Attorney, Agent, or Firm*—Zilka-Kotab, PC (57) ABSTRACT

A network device discovery system, method, and computer program product are provided. In use, topological information associated with a plurality of network devices is identified. Further, network connectivity among the plurality of network devices is discovered based on the topological information.

18 Claims, 6 Drawing Sheets

SYSTEM, METHOD AND COMPUTER PROGRAM PRODUCT FOR DISCOVERING NETWORK CONNECTIVITY AMONG NETWORK DEVICES BASED ON TOPOLOGICAL INFORMATION

FIELD OF THE INVENTION

The present invention relates to networks, and more particularly to network connectivity among network devices.

BACKGROUND

Networks generally include a plurality of devices that are interconnected to facilitate intercommunication. It is often desired to identify connectivity among the various devices on the network. Traditionally, brute force discovery techniques, such as a series of brute force algorithms, have been utilized for identifying such connectivity. However, brute force discovery techniques typically include checking connectivity among each possible pair of devices on the network, resulting in inefficient discovery of network connectivity. There is thus a need for addressing these and/or other issues associated with the prior art.

SUMMARY

A network device discovery system, method, and computer program product are provided. In use, topological information associated with a plurality of network devices is identified. Further, network connectivity among the plurality of network devices is discovered based on the topological information.

DETAILED DESCRIPTION

Figure 1:
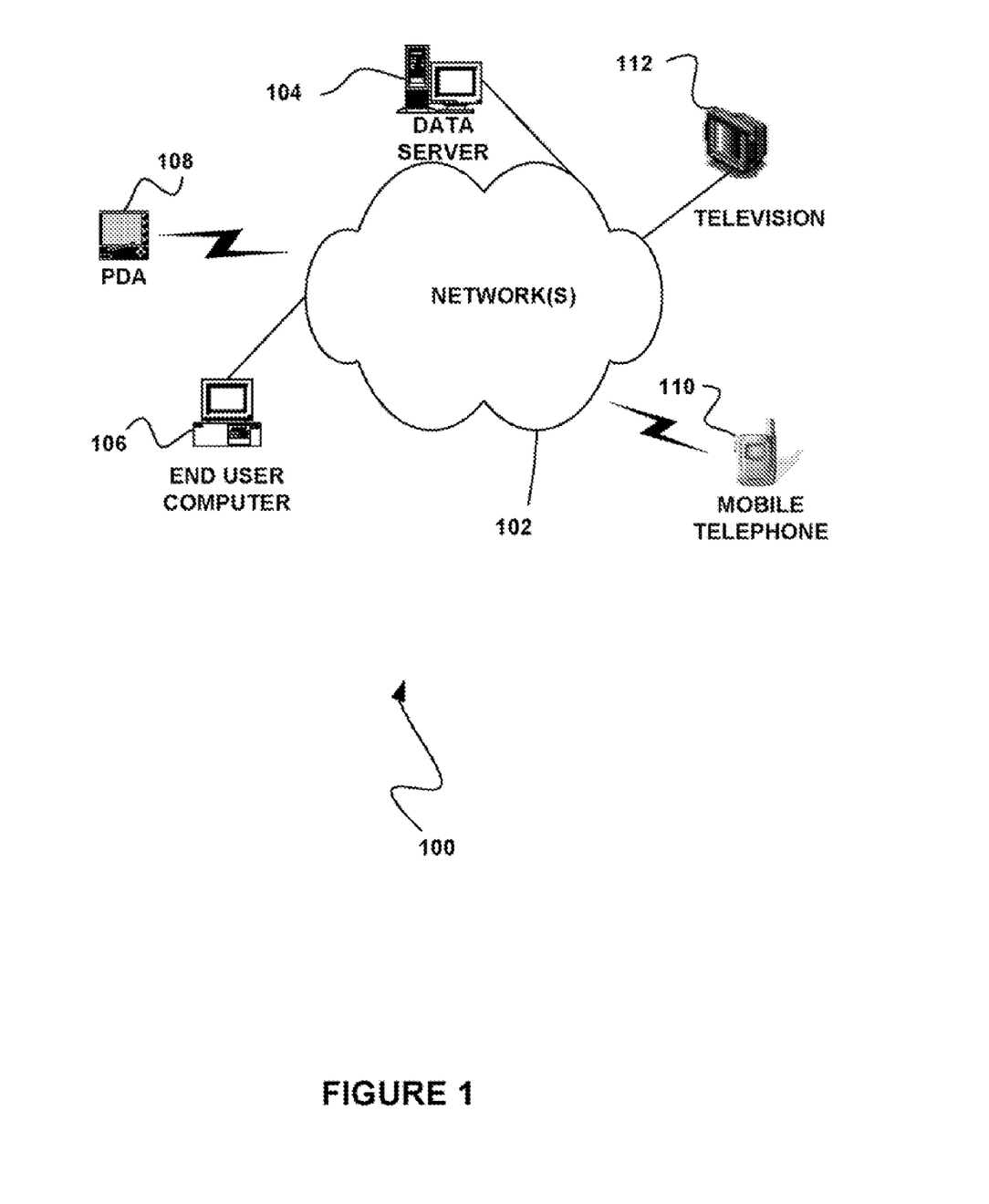
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
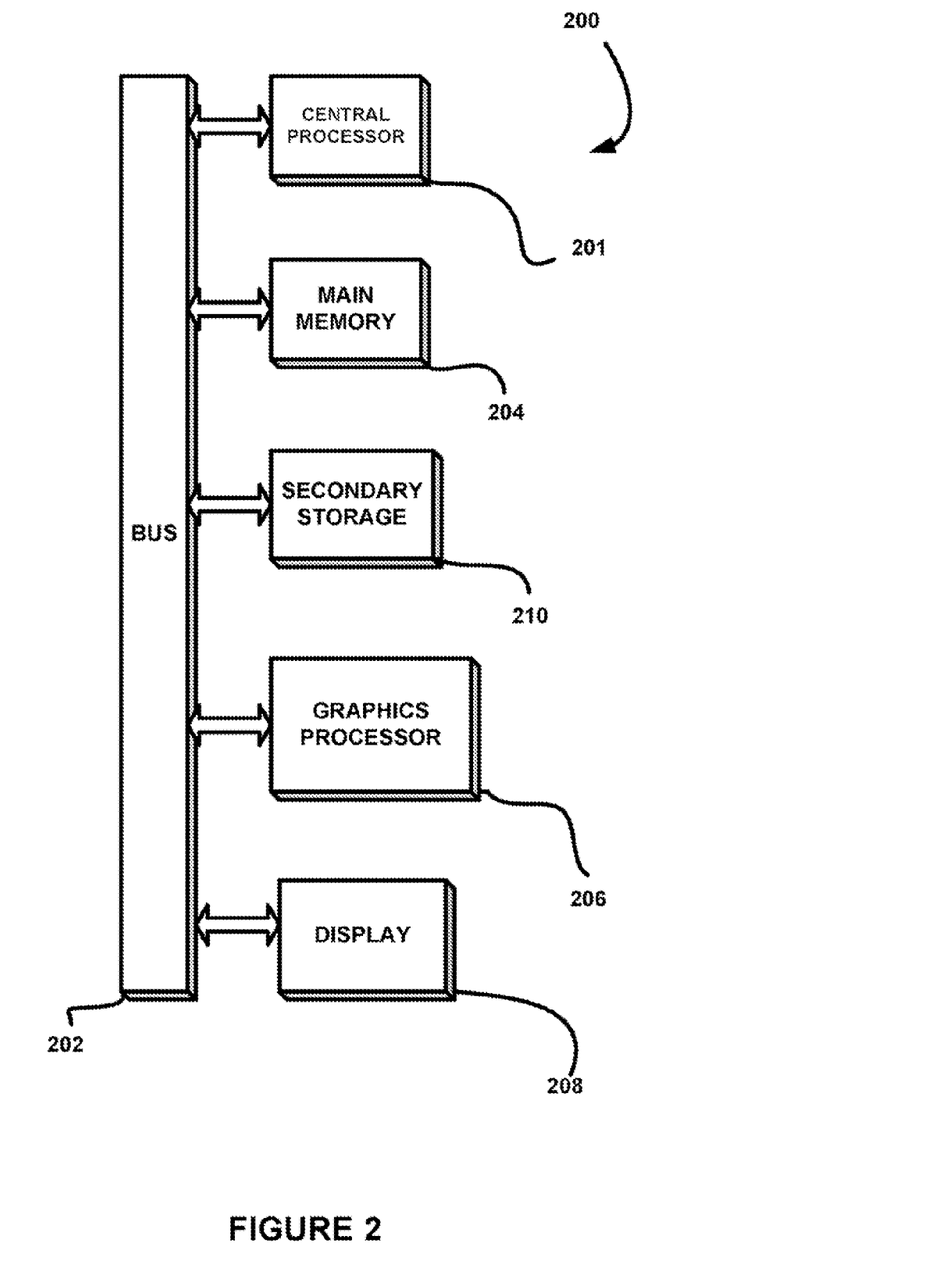
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
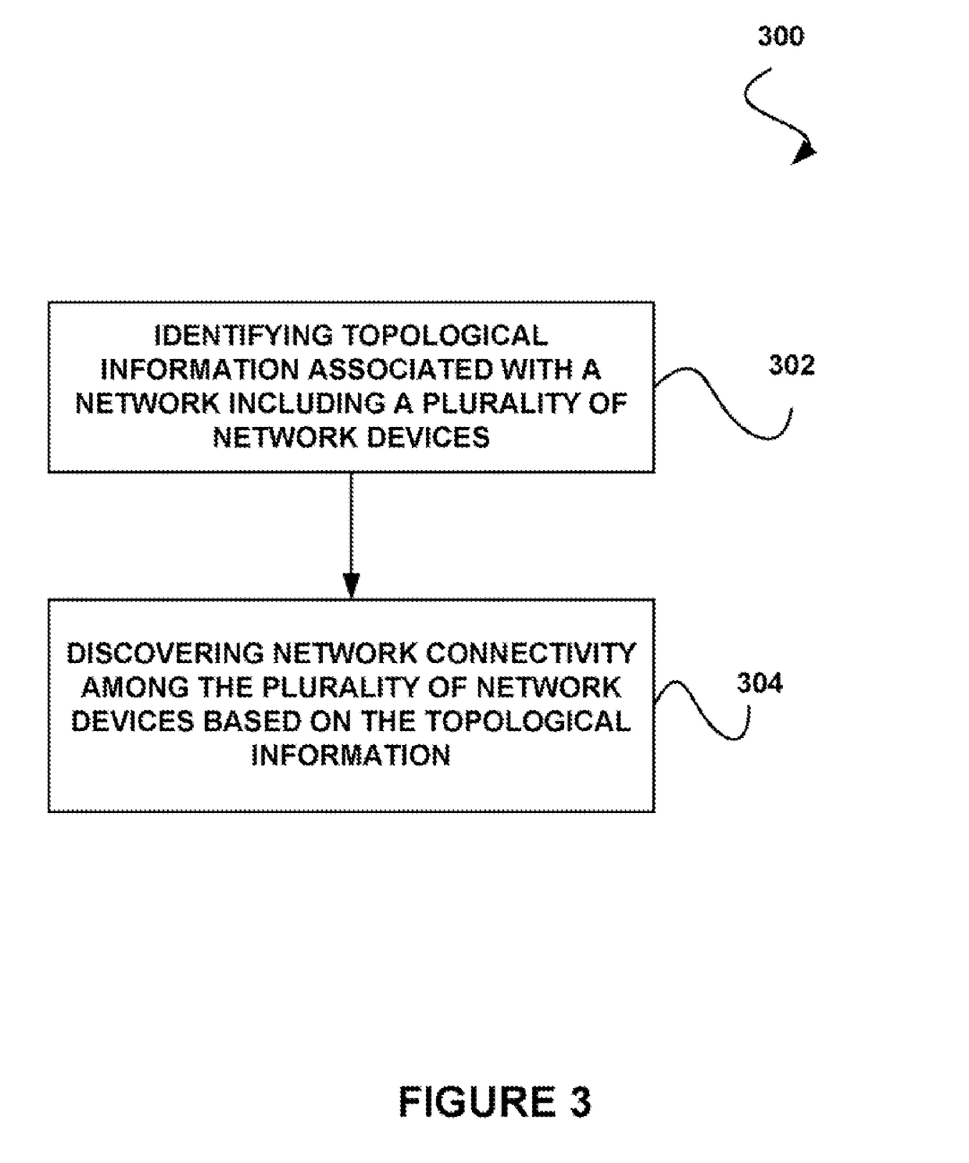
FIG. 3 shows a method for discovering network connectivity among network devices based on topological information, in accordance with one embodiment.

FIG. 3 shows a method 300 for discovering network connectivity among network devices based on topological information, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, topological information associated with a network including a plurality of network devices is identified. The network devices may include any devices capable of being located on a network. For example, the network devices may include a router, a switch, and/or any of the devices described above with respect to FIGS. 1 and/or 2. Of course, it should be noted that the network devices may include different types of network devices, such as any combination of the devices described above.

In addition, the network may include any system capable of facilitating communication between the network devices. For example, the network may allow communication between a first network device and a second network device. Optionally, the network may include an Internet protocol (IP) network, a multi-protocol label switching (MPLS) network, any of the networks described above with respect to FIG. 1, etc.

In the context of the present description, the topological information refers to any information referring to the manner in which the network devices are configured in the network. In one embodiment, the topological information may include a link structure of the network devices. For example, such link structure may identify connectivity among any of the network devices.

In another embodiment, the topological information may include a hierarchy of the network devices. For example, the network on which the network devices are located may include a plurality of different hierarchical levels (e.g. layers, etc.). In one illustrative embodiment, an IP network may include an MPLS core level, an aggregation level and an access level. Further, each level may include a plurality of network devices of a single type. Thus, the type of a network device may be based on the topological level in the network where the network device is located. To this end, the topological information may identify a hierarchical level associated with each of the network devices.

In yet another embodiment, the topological information may include connectivity rules associated with the network. Such connectivity rules may identify the availability of connections between different types of network devices (e.g. network devices of particular hierarchical levels, etc.). Just by way of example, the connectivity rules may indicate that a network device of a first type may only be in direct communication with (i.e. directly connected to) at least one other network device of the first type and/or at least one network device of a second type. Moreover, the topological information may be based on the type of network. For example, the topological information may reflect a virtual private network (VPN) configuration, etc.

Still yet, network connectivity among the plurality of network devices is identified based on the topological information, as shown in operation 304. The network connectivity may include any connections (e.g. logical connections, physical connections, etc.) between the network devices. In this way, network connectivity may be discovered at a logical IP layer and/or a physical IP layer. In one embodiment, such connections may include links capable of allowing communication between network devices, for example. Optionally, the network connectivity may include at least one direct connection between any pair of the network devices.

In other embodiments, the connections may include point-to-point connections. Such point-to-point connections may include, for example, switch-to-switch connections, switch-to-router connections, router-to-router connections, etc. In addition, the point-to-point connections may be identified utilizing a spanning tree protocol (STP) information, a transparent bridge forwarding database (TpFDB), address resolution protocol (ARP), etc.

In another embodiment, the connections may include router connections. Such router connections may identify connections between routers. In various embodiments, the router connections may be identified utilizing information gathered via various routing protocols, such as subnet matching, simple routing, routing information protocol (RIP) information, open shortest path first (OSPF) protocol information, etc. More information regarding different embodiments for identifying such connections utilizing the various network connectivity discovery techniques will be described in with respect to FIG. 5.

In another embodiment where the topological information includes a hierarchy, network connectivity may be determined for each level in the hierarchy according to allowed connections associated with such level. For example, it may be determined whether each network device is connected to another network device at the same level in the hierarchy and/or at a lower (e.g. immediately lower, etc.) level in the hierarchy. In another embodiment where the topological information identifiers available connections between network devices, network connectivity may be identified only for pairs of devices for which connectivity is available. Of course, it should be noted that the network connectivity may be identified for the network devices in any desired manner that is based on the topological information.

As a further option, the network connectivity among the plurality of network devices may be discovered periodically. For example, the network connectivity may be discovered after a predetermined time period. As yet another option, the network connectivity among the plurality of network devices may be discovered in response to an event (e.g. a newly discovered device on the network, etc.). Of course, however, the network connectivity may be discovered at any desired time.

In this way, network connectivity among network devices may be determined based on a topology of such network devices. Accordingly, in one possible embodiment, one may avoid unnecessary discovery of network connectivity among devices that are incapable of being connected and/or for devices already determined to be connected. Thus, network connectivity among network devices may be more efficiently identified, while preventing the need for brute force discovery techniques. Of course, embodiments are envisioned which incorporate brute force discovery techniques that serve in combination with the techniques discussed hereinabove.

More illustrative information will now be set forth regarding various optional architectures and features of different embodiments with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
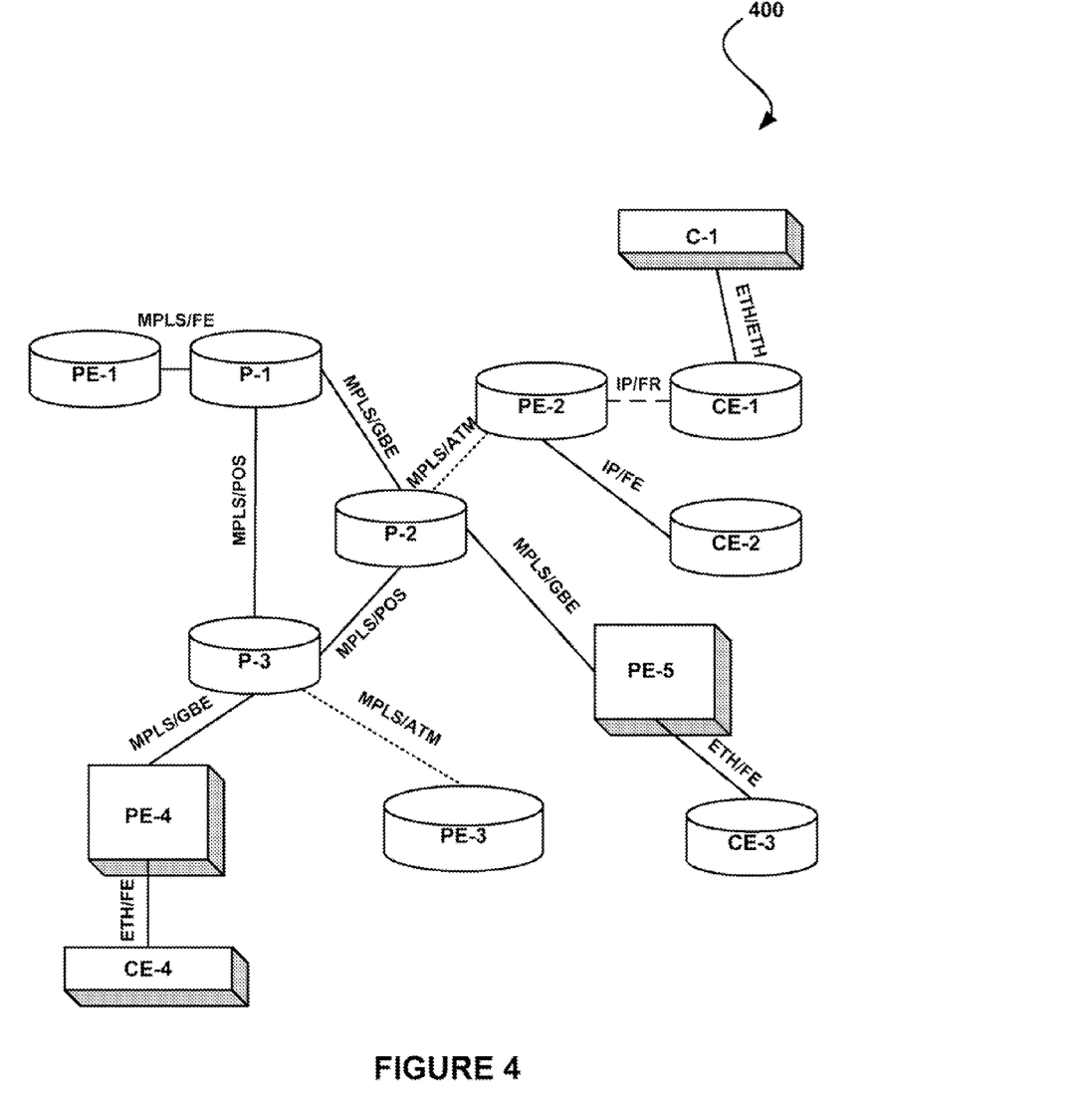
FIG. 4 shows a network and the network connectivity among a plurality of devices located thereon, in accordance with another embodiment.

FIG. 4 shows a network 400 and the network connectivity among a plurality of devices located thereon, in accordance with another embodiment. As an option, the network 400 may be implemented in the context of the details of FIGS. 1-3. Of course, however, the network 400 may be implemented in any desired environment. Again, the aforementioned definitions may equally apply to the description below.

As shown, a network 400 includes a plurality of devices. As shown in FIG. 4, such devices may include connected routers and switches. Of course, however, it should be noted that such devices may include any devices capable of being located on the network 400. In the context of the present optional embodiment, the network 400 may include an IP MPLS network, for example. Still yet, such network 400 may optionally provide layer 2 and layer 3 virtual private network (VPN) services. Accordingly, the topology, and therefore network connectivity, of the routers and switches on the network 400 may be based on the VPN services provided by the network 400 along with such IP MPLS network type, as described below.

Further, connections between the routers and switches may include point-to-point connections (e.g. layer 2 connections), routed connections (e.g. layer 3 connections), etc. In various embodiments, the point-to-point connections (denoted by solid connection lines in FIG. 4) may include switch-to-switch connections, switch-to-router connections, and/or router-to-router connections. In various other embodiments, the routed connections (denoted by dashed connection lines in FIG. 4) may indicate IP connectivity, for example, and may include router-to-router connections.

Moreover, as shown, each connection may utilize a particular protocol type and physical interface type (denoted in the xxx/yyy format respectively) for allowing communication between the routers and/or switches, examples of which are described below. Of course, it should be noted that while particular examples of protocol types and physical interface types are described herein, any desired type of connection may be utilized for providing network connectivity among devices.

In the context of the present example, the topology associated with the network 400 may include four layers. Further, each layer in the network 400 may be associated with a particular type of device and specific network connectivity associated therewith, according to the topology, as will become apparent below. In this way, the topology may be utilized to identify types of devices and the interconnectivity associated therewith. It should be noted that, while four layers are shown, any number of layers may be included within the network 400 based on the topology of the network 400.

For example, as shown, the network 400 includes a top (e.g. core, etc.) level. The top level includes provider (P) routers. In addition, such P-routers are connected to (i.e. in communication with) each other via MPLS. As also shown, each connection may utilize a different transmission protocol. For example, the connections may include a gigabit Ethernet (GBE) connection or a packet over sonet (POS) connection.

At a next level, the network 400 includes a second level (e.g. aggregation level, etc.). The second level includes provider edge (PE) routers and switches. Further, such PE-routers and PE-switches are only connected to devices in the top layer (P-routers) via MPLS utilizing GBE connections, fast Ethernet (FE) connections and/or asynchronous transfer mode (ATM) connections. Accordingly, PE-routers and PE-switches may not be directly connected with each other, but may only be connected indirectly via P-routers within the top level.

At yet a further level, the network 400 includes a third level (e.g. access layer, etc.). The third level includes customer edge (CE) routers and switches. Moreover, such CE-routers and CE-switches are only connected to devices within the second level (PE-routers and PE-switches). Thus, devices within the third level are not necessarily directly connected to each other. As shown, such connections are made utilizing IP, Ethernet (ETH) via FE, frame relay (FR) and/or simple ETH. To this end, PE-routers and PE-switches may only be connected to P-routers, CE-routers and CE-switches (i.e. devices within the top level and devices within the third level).

Still yet, the network 400 includes a fourth level. The fourth level includes customer (C) routers and switches. As shown, the C-switch is only connected to a device at the third level (CE-router). Thus, C-routers and C-switches may only be connected to CE-routers and CE-switches. For example, such CE-routers and CE-switches may provide wide area network (WAN) connectivity for such C-routers and C-switches. Additionally, the C-routers and C-switches may be connected utilizing ETH, as shown.

Thus, devices at a top level may only be connected with each other and with devices at a second level, and so forth, according to the topology of the network 400. Thus, devices within t he network 400 may only communicate directly where such connections are provided based on the topology of such network 400, and may otherwise optionally communicate indirectly. In addition, while an IP MPLS network 400 is described herein with particular network devices connected based on an associated network topology, it should be noted that such network type is set forth for illustrative purposes only. Thus, network connectivity among devices on a network 400 may be determined for any desired network 400 associated with a particular topology.

Figure 5:
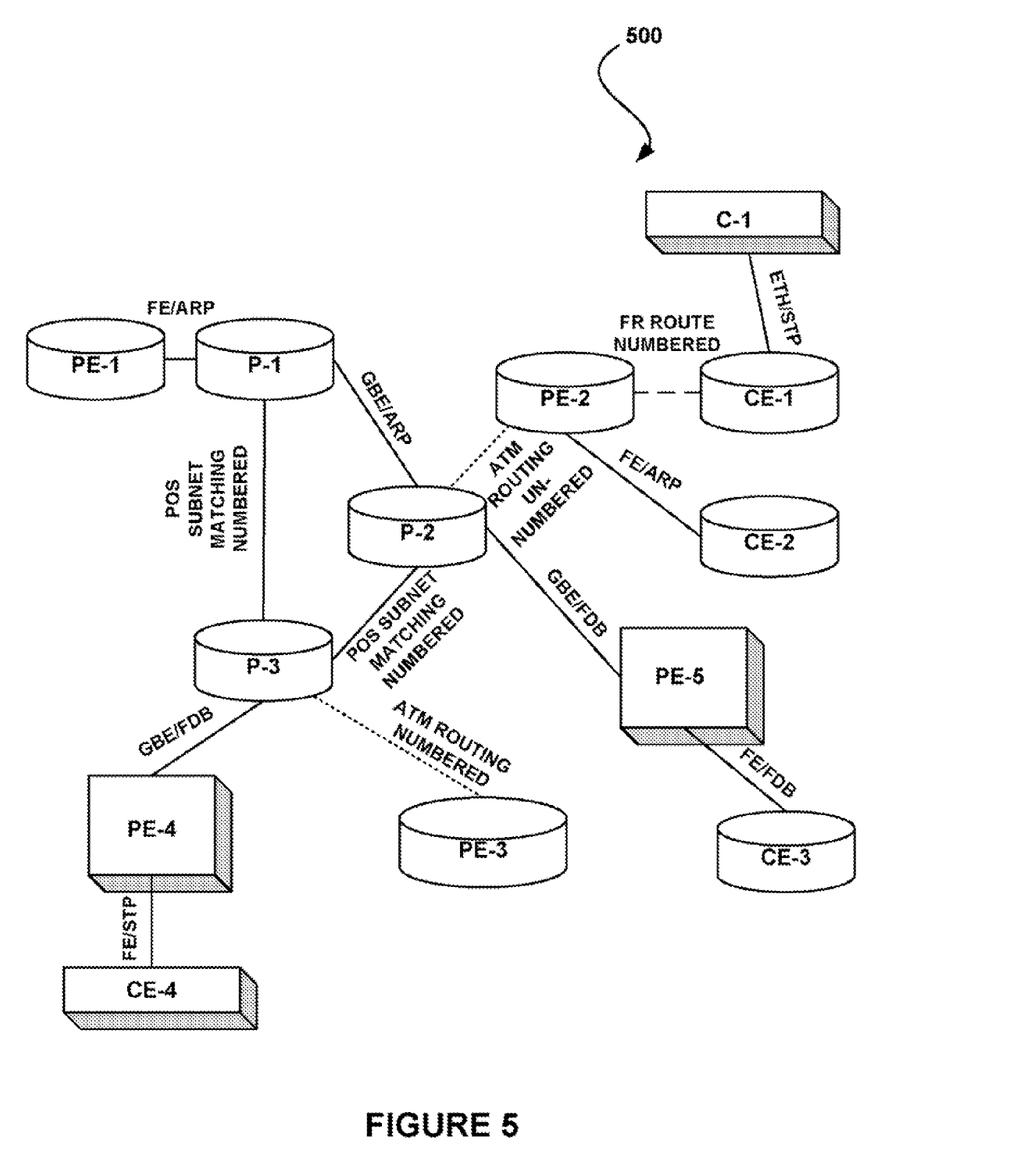
FIG. 5 shows a network and various network connectivity discovery techniques utilized for identifying the network connectivity among devices on the network, in accordance with yet another embodiment.

FIG. 5 shows a network 500 and various network connectivity discovery techniques utilized for identifying the network connectivity among devices on the network, in accordance with yet another embodiment. As an option, the network 500 may be implemented in the context of the details of FIGS. 1-4. Of course, however, the network 500 may be implemented in any desired environment. Again, the aforementioned definitions may equally apply to the description below.

As shown, the network 500 includes a plurality of devices located thereon at different topological levels. In addition, connections between such devices are discovered utilizing various different protocols. As specifically shown, connection types (e.g. transmission protocols and/or routing protocols) and network connectivity discovery techniques are shown for the various network connections between devices on the network 500. It should be noted that while various network connectivity discovery techniques are described herein, such techniques are set forth for exemplary purposes only. Accordingly, any desired type of techniques may be utilized for discovering network connectivity associated with devices on the network 500.

Point-to-point connections between switches, switches and routers, or routers, may be discovered utilizing point-to-point discovery techniques. In one embodiment, such point-to-point discovery techniques may include utilizing STP information to discover network connectivity among switches. In another embodiment, the point-to-point discovery techniques may include utilizing a TpFDB. For example, such TpFDB may identify for each destination address an associated source address. In yet another embodiment, the point-to-point discovery techniques may include utilizing ARP.

Further, routed connections between routers may be discovered utilizing routed discovery techniques. In one embodiment, the routed discovery techniques may include utilizing subnet matching to discover network connectivity among routers. For example, IP interface subnet matching information may be utilized on numbered interfaces.

In another embodiment, the routed discovery techniques may include utilizing routing information to discover such network connectivity. Just by way of example, routing information may be utilized on dual point interfaces (of the network devices) that are numbered and/or un-numbered via routing tables and/or static routing from configuration files. In still yet another embodiment, OSPF protocol neighborhood information may be utilized for discovering routed network connectivity.

Optionally, the subnet matching and the routing may be utilized and/or configured for different types of interfaces. For example, such subnet matching and routing techniques may be utilized based on transmission type, whether the interface is numbered/un-numbered, the type of device the interface is located on and/or any other information capable of being associated with such interfaces. In various exemplary embodiments, a packet over sonet (POS) subnet matching numbered protocol, an ATM routing un-numbered protocol and/or an ATM routing numbered protocol may be utilized for identifying network connectivity among routers. Thus, as shown, a plurality of different network connectivity discovery techniques may be utilized for identifying network connectivity among devices on the network 500.

Figure 6:
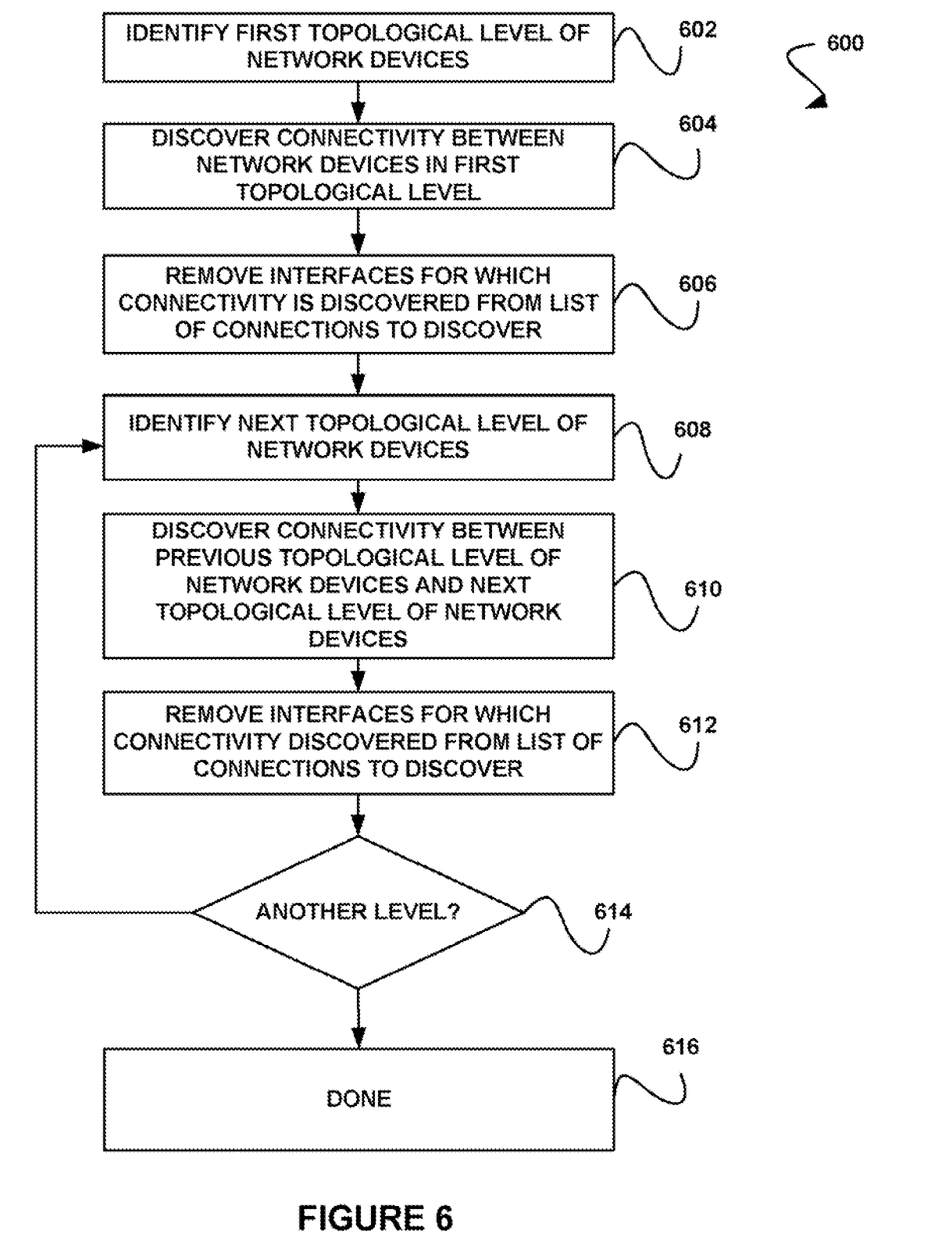
FIG. 6 shows a method for discovering network connectivity among devices on a network based on topological information associated with such network devices, in accordance with yet another embodiment.

FIG. 6 show a method 600 for discovering network connectivity among devices on a network based on topological information associated with such network devices, in accordance with yet another embodiment. As an option, the method 600 may be carried out in the context of the details of FIGS. 1-5. Of course, however, the method 600 may be carried out in any desired environment. Again, the aforementioned definitions may equally apply to the description below.

As shown in operation 602, a first topological level of network devices is identified. Optionally, the first topological level may be identified based on the type of network on which the network devices are located. Thus, the type of network may indicate a particular topology associated therewith.

In one embodiment, the first topological level may include a top level of the network devices, but, of course, may also include any desired topological level of network devices. In another embodiment, the first level may include a single type of network devices located therein (e.g. provider routers, etc.). To this end, identifying a first topological level may include identifying devices located within such first topological level.

As an option, various parameters associated with the devices on the network may also be identified. Such parameters may include a type of each network device (e.g. P router, etc.), whether each device includes a numbered or un-numbered interface, and/or any other parameter capable of being associated with at least one device on the network. Further, the parameters may be identified utilizing different protocols, such as simple network management protocol (SNMP), command line interface (CLI), etc. Moreover, the parameters may be identified prior to identifying the first topological level of network devices. Accordingly, the parameters may be utilized for identifying types of network devices (i.e. network devices within each topological layer) and/or for discovering connectivity among such devices, as described below.

To this end, connectivity among network devices in the first topological level is discovered, as shown in operation 604. Thus, if the first topological level includes provider (P) routers, discovery techniques capable of identifying connections between such P-routers may be utilized for discovering such connectivity. For example, all discovery techniques capable of discovering connectivity among P-routers may be identified, but, of course, any combination thereof and/or any single discovery techniques may also be utilized.

In one embodiment, such discovery techniques may include ARP. In another embodiment, the discovery techniques may include point-to-point subnet matching. For example, such point-to-point subnet matching may utilize serial port information associated with numbered interfaces (e.g. two POS interfaces, subnet/30). In yet another embodiment, the discovery techniques may include point-to-point routing. Such point-to-point routing may optionally utilize routing information between un-numbered interfaces on serial ports (e.g. two POS interfaces).

Further, interfaces for which connectivity is discovered are removed from a list of connections to discover, as shown in operation 606. The list of connections to discover may include a list of potential connections between each different pair of devices on the network. Still yet, such list of connections may be based on a topology of the network (e.g. based on connection availability for each pair of devices allowed by the topology, etc.).

Additionally, each of the interfaces may be associated with a particular device on the network. For example, such interfaces may be utilized for communicating with the devices over the network. To this end, as will be described below, pairs of interfaces for which connectivity has been discovered may not necessarily have discovery protocols repeatedly applied thereto.

Also, as shown in operation 608, the next topological level of network devices is identified. In one embodiment, such next topological level may include the level immediately subsequent to a topological level for which network connectivity has been discovered. It should be noted, however, that the next topological level may also include any other level for which network connectivity has not been discovered.

Just by way of example, the next topological level of network devices may include provider edge (PE) routers and switches. Furthermore, connectivity among the previous topological level of network devices and the next topological level of network devices (identified from operation 608) is discovered. Note operation 610. The discovery protocols utilized for discovering such connectivity may be based on the next topological level, for example.

In one exemplary embodiment, where the next topological level includes PE-routers and PE-switches, connectivity among P-routers and such PE-routers\PE-switches may be discovered. In addition, network discovery techniques utilized for discovering such connectivity may include ARP. As another option, such network discovery techniques may include routing for numbered and/or un-numbered interfaces. Still yet, subnet matching for numbered interfaces (e.g. on a /30 sub-network for serial interfaces) may also be utilized [e.g. POS, high level data link control (HDLC), Serial, etc.]. In other various examples, TpFDB (e.g. for PE-switches) and/or OSPF may also be utilized for discovering network connectivity among P-routers and such PE-routers/PE-switches.

Additionally, interfaces for which connectivity is discovered are removed from the list of connections to discover, as shown in operation 612. In this way, the list of connections to discover may be updated to include only potential connections between devices for which a connection has not been discovered. It is further determined whether there is another topological level of network devices within the network for which network connectivity discovery techniques have not been applied. Note decision 614.

If it is determined that another such topological level exists, network devices for such next topological level are identified (operation 608). In addition, connectivity among devices within such next topological level and devices within the previous topological level is discovered (operation 610). To this end, network connectivity may be identified for devices on a network based on a topology of such network.

Thus, in one optional embodiment, customer edge (CE) routers and switches may be identified. Additionally, connections between such CE-routers/CE-switches and the PE-routers/PE-switches may be discovered. For example, such connectivity may be discovered utilizing STP for PE-switches and CE-switches, TpFDB for PE-switches and CE-routers, routing numbered/un-numbered [e.g. utilizing virtual routing and forwarding (VRF), virtual forwarding instance (VFI), etc. information first], ARP and/or OSPF.

Moreover, interfaces for which connectivity is discovered may be removed from the list of connections to discover. Still yet, customer (C) routers and switches may be identified, and network connectivity among such C-routers/C-switches and CE-routers/CE-switches may be discovered. Optionally, STP for CE-switches and C-switches and accessible local area network (LAN) segments may be utilized for discovering such connectivity. Various other options may include TpFDB for CE-routers and C-switches and/or ARP for C-routers.

Accordingly, utilizing the topology of the network, as described above, may provide an efficient connectivity discovery process by preventing repeated discovery from being applied to devices for which connectivity has already been discovered. In particular, unnecessary discovery between each possible pair of devices within a network may optionally be prevented by utilizing discovery techniques based on topological position information that identifies pairs of devices (e.g. based on topological levels associated therewith) that are capable of being connected. Moreover, scalability of network connectivity discovery for networks with numerous devices located thereon may be limited.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying topological information associated with a network including a plurality of network devices; and
    discovering network connectivity among the plurality of network devices based on the topological information;
    wherein a plurality of different techniques are utilized for discovering the network connectivity among each of the plurality of network devices based on a type of each of the network devices;
    wherein network devices of a first type are only connected to each other and to network devices of a second type;
    wherein the topological information includes a hierarchy and the network connectivity is determined for each level in the hierarchy according to allowed connections associated with each level in the hierarchy.

2. The method of claim 1, wherein the topological information includes a link structure of the plurality of network devices.

3. The method of claim 1, wherein the plurality of network devices each include at least one of a router and a switch.

4. The method of claim 1, wherein the network devices include a plurality of different types of network devices.

5. the method of claim 4, wherein the plurality of different types of network devices each reside on a different topological level.

6. The method of claim 1, wherein the network devices of the second type are only connected to network devices of a third type.

7. The method of claim 1, wherein discovering the network connectivity among the plurality of network devices includes at least one of discovering point-to-point connections and routed connections.

8. The method of claim 7, wherein the point-to-point connections are discovered and include at least one of switch-to-switch connections discovered using a spanning tree protocol (STP) information, switch-to-router connections discovered using a transparent bridge forwarding database, and router-to-router connections discovered using an address resolution protocol (ARP).

9. The method of claim 7, wherein the routed connections are discovered and include router connections discovered using at least one of subnet matching, routing, and an open shortest path first (OSPF) protocol.

10. The method of claim 1, further comprising identifying parameters associated with each of the plurality of network devices.

11. The method of claim 10, wherein the parameters are identified utilizing a protocol including at least one of a simple network management protocol (SNMP) and a command line interface (CLI).

12. The method of claim 10, further comprising identifying the type of each of the plurality of network devices utilizing the parameters.

13. The method of claim 1, wherein discovering the network connectivity among the plurality of network devices includes discovering a network connection between a pair of network devices within the plurality of network devices only once.

14. The method of claim 1, wherein, in response to discovering network connectivity among a pair of the plurality of network devices, the pair of network devices are removed from a list.

15. The method of claim 1, wherein the discovering is performed periodically.

16. A computer program product embodied on a computer readable medium, comprising:
    computer code for identifying topological information associated with a network including a plurality of network devices; and
    computer code for discovering network connectivity among the plurality of network devices based on the topological information;
    wherein the computer program product is operable such that a plurality of different techniques are utilized for discovering the network connectivity among each of the plurality of network devices based on a type of each of the network devices;
    wherein network devices of a first type are only connected to each other and to network devices of a second type;
    wherein the computer program product is operable such that the topological information includes a hierarchy and the network connectivity is determined for each level in the hierarchy according to allowed connections associated with each level in the hierarchy.

17. A system, comprising:
    a processor adapted for identifying topological information associated with a network including a plurality of network devices, the processor further adapted to discover network connectivity among the plurality of network devices based on the topological information;
    wherein the system is operable such that a plurality of different techniques are utilized for discovering the network connectivity among each of the plurality of network devices based on a type of each of the network devices;
    wherein network devices of a first type are only connected to each other and to network devices of a second type;
    wherein the system is operable such that the topological information includes a hierarchy and the network connectivity is determined for each level in the hierarchy according to allowed connections associated with each level in the hierarchy.

18. The system of claim 17, further comprising memory coupled to the processor via a bus.

* * * * *

UNITED STATES PATENT AND TRADEMARK OFFICE
CERTIFICATE OF CORRECTION

Page 1 of 1

PATENT NO. : 7,729,353 B1
APPLICATION NO. : 11/671849
DATED : February 6, 2007
INVENTOR(S) : Gabriel Podolsky It is certified that error appears in the above-identified patent and that said Letters Patent is hereby corrected as shown below:

Col. 3, line 61, please replace "identifiers" with -- identifies --.

Col. 9, line 35 claim 4, please replace "the" with -- The --.

Signed and Sealed this
Seventeenth Day of May, 2011

David J. Kappos
*Director of the United States Patent and Trademark Office*